H. DUNKERLY.
WEIGHING AND FILLING MACHINE.
APPLICATION FILED SEPT. 25, 1909. RENEWED OCT. 3, 1910.
977,378.
Patented Nov. 29, 1910.
2 SHEETS—SHEET 1.
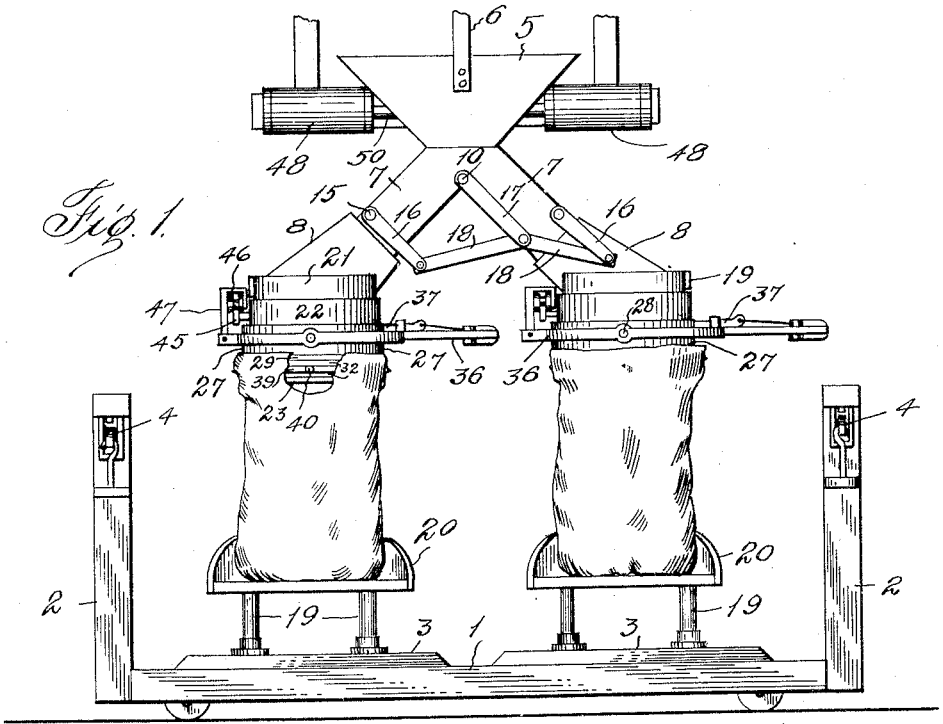
Fig. 1.
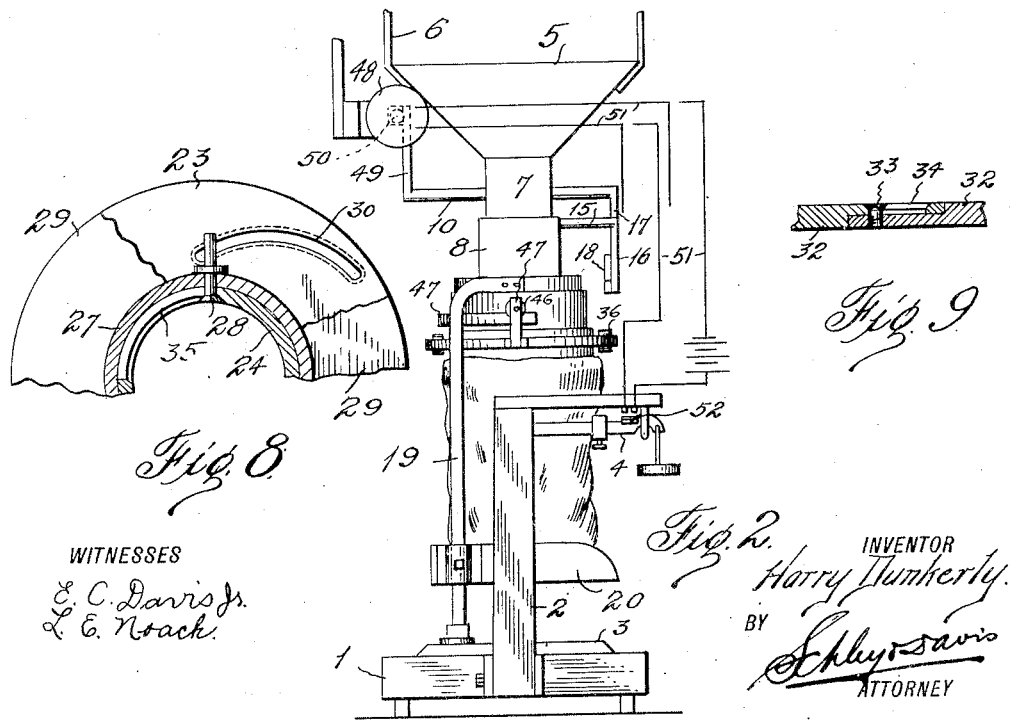
Fig. 8.
Fig. 2.
Fig. 9.
WITNESSES
E. C. Davis Jr.
L. E. Noack.
INVENTOR
Harry Dunkerly.
BY
Schley Davis
ATTORNEY H. DUNKERLY.
WEIGHING AND FILLING MACHINE.
APPLICATION FILED SEPT. 25, 1909. RENEWED OCT. 3, 1910.
977,378.
Patented Nov. 29, 1910.
2 SHEETS—SHEET 2.
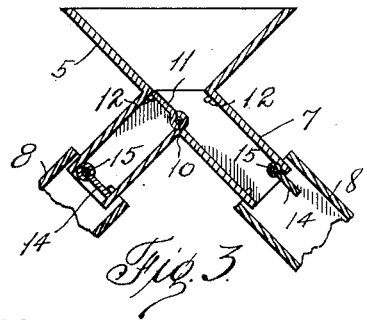
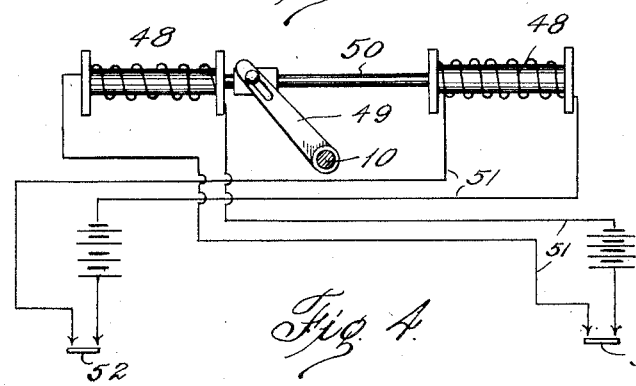
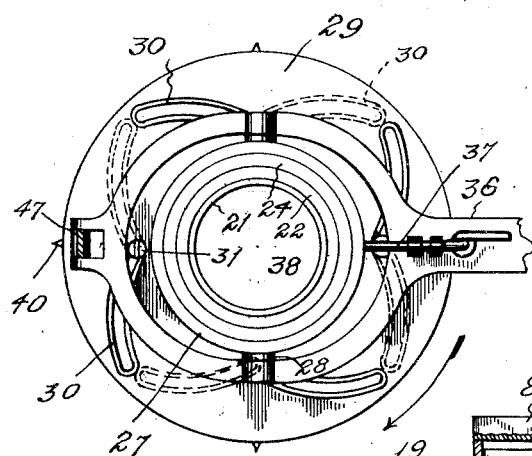
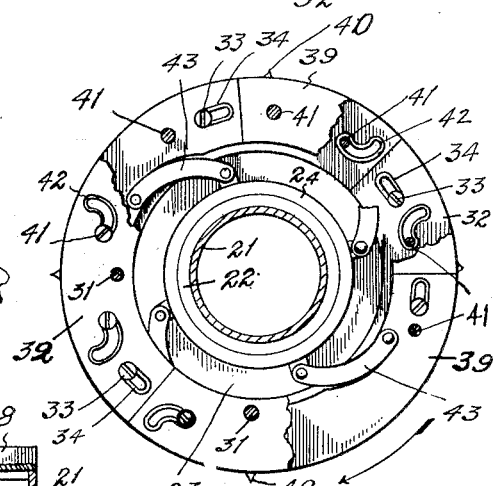
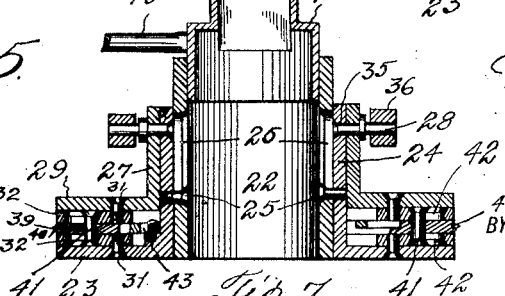
WITNESSES
E. C. Davis Jr.
L. E. Noack.
INVENTOR
Harry Dunkerly.
BY
Ashley Davis
ATTORNEY

UNITED STATES PATENT OFFICE.

HARRY DUNKERLY, OF HOUSTON, TEXAS.

WEIGHING AND FILLING MACHINE.

977,378. Specification of Letters Patent. Patented Nov. 29, 1910.

Application filed September 25, 1909, Serial No. 519,519. Renewed October 3, 1910. Serial No. 585,156.

*To all whom it may concern:*

Be it known that I, HARRY DUNKERLY, citizen of the United States, residing at Houston, in the county of Harris and State of Texas, have invented certain new and useful Improvements in Weighing and Filling Machines, of which the following is a specification.

This invention has relation to weighing and filling machines.

The object of the invention is to provide a machine involving double platform scales with a sack support independently mounted on each platform and a hopper supported over the platforms with opposed outlets, one over each sack support.

Another feature resides in a valve mechanism operated alternately by the scale beams arranged to alternately direct the material being weighed and sacked into the sacks.

A still further object lies in mechanism for engaging and releasing the sacks adapted to support sacks of different sizes and arranged to be vibrated to dislodge any material which accumulates in said mechanism.

Finally the object of the invention is to provide means of the character described that will be strong, durable, efficient, and easy of operation, simple and comparatively inexpensive to construct, and also in which the several parts will not be likely to get out of working order.

With the above and other objects in view, the invention has relation to certain novel features of construction and operation, an example of which is described in this specification and illustrated in the accompanying drawings, wherein:

Figure 1. is a side elevation of the machine, Fig. 2. is an end elevation of the machine, Fig. 3. is a vertical section of the hopper, Fig. 4. is a diagrammatical view of the electric circuits, Fig. 5. is a plan view of one of the sack holding mechanisms, Fig. 6. is a similar view with parts broken away, Fig. 7. is a vertical section of one of the filling spouts and sack holding mechanism, Fig. 8. is a detail of one of the expansion rings, and Fig. 9. is a detail section of one of the expansion collars.

In the drawings the numeral 1, designates a scale frame at each end of which a scale beam standard 2 is mounted, while two platforms 3 are arranged on the frame. A scale beam 4 is mounted in each standard. These parts are of the same construction as the usual platform scale now commonly in use except that the frames of the scales are joined together. Each platform 3 has connection with the scale beam 4 of the adjacent standard 2.

A hopper 5 is suitably supported over the platforms by hangers 6 suspended from a support (not shown). At its lower end the hopper terminates in diverging chutes 7 extending, each at an angle of about 45 degrees. These chutes project, each a short distance into the contracted mouth of a filling spout 8. Each spout extending substantially parallel with the chute which it receives and being somewhat larger, will permit a free vertical movement of the spout without the mouth coming into contact with the chute.

Through the hopper at the inter-section of the chutes, a transverse operating shaft 10 is mounted and projects at each end. A deflecting valve 11 is secured on this shaft and adapted to alternately rest against stops 12 at the entrance of each shute and cut off the supply thereto and to lie at such an angle as to deflect or guide the load or material into the open chute. Near the lower end of each chute a cut off valve 14 is fixed on a shaft 15 projecting through the wall of the chute. On the projecting end of each shaft 15 a lever 16 is fastened; while a similar lever 17 projects from the adjacent end of the shaft 10. The lower ends of these levers are pivotally connected with links 18 and project substantially parallel. This arrangement causes the valves 14 to be so positioned that one will stand across the chute, while the other extends down the other chute as shown in Fig. 3, and also the one extending across the chute will always be beneath the deflector valve 11 when the latter closes the chute.

It is obvious that by swinging the operating shaft 10 and its lever 17, the valves are swung and the load cut off from, and deflected into the spouts 8 alternately. It will also be observed that considerable space is had between the deflecting valve and the cut-off valve when the latter is swung across the chute. By this arrangement the material in the chute is caught and held after the deflecting valve has started to swing and close the chute. Ordinarily this material would drop into the spout, thus delivering more material therein than was actually weighed.

On each platform 3 a support comprising a pair of upright posts 19 is secured. A short distance above the platform a rest 20 is adjustably mounted and fastened on each pair of posts. These rests receive and support the bottoms of the sacks. As the mechanism for holding the sacks comprises substantially duplicate parts, a description of those connected to one of the spouts will suffice for the others.

Between the upper ends of one of the pairs of posts 19, the annular portion 21 of an inclined filling spout 8, is mounted. The upper end of the spout freely receives the lower end of one of the chutes 7 so as to permit the spout to move vertically during the weighing action without contacting with the chute. This is a very important feature for the reason that if the spout at any point during the weighing action came into contact with the chute or any other fixed part, a perfect weighing action would not be had.

A tubular member 22 depends from the annular portion 21 of the spout as is shown in Fig. 7. An outwardly extending ring-plate 23 having its under surface substantially flush with the lower end of the tubular member is provided with an upwardly extending sleeve 24 fitting snugly about the tubular member, but arranged to slide vertically thereon. This sleeve has opposed rivets 25 projecting through and headed in countersunk vertical slots 26 in the tubular member 22, permitting the sleeve to have a limited vertical movement but holding it and the plate 23 against rotation. A shorter sleeve 27 fits on the upper end of the sleeve 24 and is held by trunnion pins 28 passing through both sleeves and projecting outward therefrom. The heads of the trunnion pins rest in counter-sunk slots 35 in the sleeve 24 which cause the sleeve 27 to move in unison vertically with the sleeve 24, but permit the sleeve 27 to rotate independently of the sleeve 24. The sleeve 27 at its lower end is provided with an outwardly extending ring-plate 29 similar to the ring-plate 23, but held above the same so as to provide a space therebetween.

The plates 23 and 29 are each provided with a plurality of outwardly curved slots 30, each counter-sunk to receive a headed rivet 31 as shown in Figs. 5, 7, and 8. The inner ends of the slots 30 of the plates register, but those of one plate curve away from those of the other plate as indicated in Fig. 5. Expansion collars 32 are held between the plates by the said rivets. As shown in Figs. 6 and 9, the sections of these collars are lapped each with a rivet 33 fixed in one and engaging in a circumferential slot 34 of the other. The rivets 31 are fixed in the collars 32.

From the foregoing it will be seen that by reason of the rivets 25, the plate 23 and sleeve 24 are held against rotation, but by reason of the slots 35, the sleeve 27 and plate 29 may be rotated. For rotating the sleeve 27, a lever 36 surrounding the sleeve is engaged with the trunnion pins 28 and provided with a plunger 37 adapted to engage with notches 38 in the sleeve 24 whereby it may be locked in position. When the sleeve 27 is rotated the rivets 31 will be forced outward in the slots, the slots of the plate 29 passing over the slots of the fixed plate 23 until the rivets come to rest at the outer ends of the slots 30. This movement expands the collars 32 radially, the rivets 33 sliding in the slots 34.

Between the collars 32 a sectional plunger ring 39 jointed like the collars 32 and adapted to be expanded is arranged. This plunger ring normally stands substantially flush with the plates 23 and 29 and the collars 32 and is provided with a plurality of spurs 40 on its periphery. The sack is placed about the plunger ring and caught on the spurs. As sacks of different diameters are used and as it is necessary to expand the plunger ring to stretch the sack, a considerable radial movement of the ring is necessary.

For transmitting the radial movement to the plunger ring from the collars 32, rivets 41 pass through the plunger ring in fixed relation thereto and are headed at each end in counter-sunk slots 42 in the collars as is shown in Figs. 6 and 7. These slots are substantially right angular in form. This is done to cause the plunger ring to expand substantially in unison with the collars while the rivets 41 are in the circumferential legs of the slots and subsequently to expand independently of the collars when the rivets 41 are in the radial legs of the slots.

From the foregoing it will be apparent that when the plate 29 is rotated, the collars are expanded by the rivets 31 riding in the slots 30, the plunger ring being expanded in unison with the collars as above explained. When the outer ends of the slots 30 are brought into contact with the rivets 31, the limit of the expansion of the collars is reached. Such an expansion is sufficient to stretch and fasten a small sack and a medium sack. However for a large sack, an additional expansion of the plunger ring 39 may be necessary. To effect this, the inner portion of the plunger is pivotally connected to the outer ends of curved links 43 having their inner ends pivoted to the plate 23 as is shown in Figs. 6 and 7. These links are so placed that during the simultaneous expansion of the collars 32 and the plunger ring, the plunger ring will be held against independent movement. Thus after the parts have been rotated to expand the collars to their limit, additional rotation in the same direction will cause the rivets 41 to travel in the radial legs of the slots 42 and the links 43 to swing the sectional plunger ring outward and stretch and fasten a large sack.

It is obvious that with this mechanism each sack is properly held for receiving the material being weighed. In case the material should arch or lodge in the spouts, on the tubular member 22, a track 45 extending about one-quarter therearound is provided, and engaged by the roller 46 of a hanger 47 connected to the center of the lever 36 to form a fulcrum point on which the lever may be swung and the bag holding parts vibrated on the tubular member 22 through the agency of the rivets 25 and the slots 26.

The weighing mechanism is electrically operated and the operating means comprises, opposed solenoids 48 suitably supported at each end of the hopper 5 and on the side opposite to the lever 17. On the projecting end of the operating shaft 10 an upright lever 49 is fixed and has engagement at its upper end with the sliding cove 50 of the solenoids. These solenoids are alternately energized and the cove 50 reciprocated which swings the operating shaft 10 whereby the deflecting valve 11 and the cut-off valves 14 are swung to deflect the material fed into the hopper, first into one spout 8 and then into the other.

Each solenoid has a separate circuit, which circuits are alternately closed. The circuits are illustrated in Fig. 4 and comprise wires 51 running to circuit closers 52 on the scale standards 2 just over the scale beams 4. One of the wires of each circuit has connection with a battery or other source of electrical supply; and further the wires of one circuit cross those of the other, so that the circuit being closed by the scale beam of one platform energizes the solenoid on the opposite side of the hopper and shifts the valves so as deflect the material into the sack on the opposite platform to the one, whose scale beam closes the circuit. Any suitable form of circuit closer may be used, as for instance the style shown and described in my application for Letters Patent on hopper scales filed April 10th, 1909, Serial Number 489,131.

The operation of my invention is as follows: The levers 36 having been swung to fasten sacks on the plunger rings 39 and one sack filled, the scale beam 4 of the platform 3 on which the sack is supported will be swung upward by the depression of the said scale beam. It contacts with the circuit closers 52 and energizes the solenoid 48 on the opposite side of the hopper which swings the valves 11 and 14 and deflects the material into the other or second sack, which when filled causes the same operation. While the second sack is being filled the first or filled sack is removed by swinging the lever 36 and withdrawing the plunger ring 39, when an empty sack is substituted and fastened.

What I claim is:

1. In a weighing mechanism, the combination with a scale having a plurality of independent platforms and independent scale beams, each platform having connection with a scale beam, a suitably supported hopper having outlet chutes disposed above the platforms, a support on each platform, a spout carried by each support, each spout adapted to receive one of the hopper chutes and to move vertically without contacting with the chute, a double cut-off in the hopper adapted to retain a certain amount of material, sack fastening means below each spout, and means for operating the double cut-off to deflect the material alternately into the spouts comprising electrical means having individual circuits arranged to be closed by the scale beam.

2. In a weighing mechanism, the combination with a scale having a plurality of independent platforms and independent scale beams, each platform having connection with a scale beam, of a hopper adapted to be supported above the platforms and having delivery chutes, a deflecting valve in the hopper adapted to deflect the load into one chute or the other, a cut-off valve in each chute some distance below the deflecting valve adapted to be swung across the chutes alternately, the valves being connected by means for simultaneously swinging the same, a support mounted on each platform, a spout fixed on each support and adapted to receive one of the chutes and to move vertically without contacting with the chute, sack fastening means associated with each spout and arranged between the same and the platform, and electrical means for operating the valves comprising circuit closers arranged to be operated by the scale beam.

3. In a weighing mechanism, the combination with a scale having a plurality of independent platforms and independent scale beams, each platform having connection with a scale beam, of a hopper suitably supported having outlet chutes disposed above the platform, valves in the hopper arranged to alternately deflect the material into one chute and cut off the delivery of the material by the other chute, a support mounted on each platform, a spout mounted on each support, sack holding means carried by the support between each spout and the platform, solenoids mounted adjacent the hopper and connected to swing the valves, and a circuit closer supported in juxtaposition to each scale beam whereby the upward swing of the scale beam closes a circuit to one of the solenoids.

4. The combination with a platform scale having a plurality of platforms, and a scale beam for each platform, of a sack support mounted on each platform, a sack holding device carried by each support, a hopper, a chute delivering from each side of the hopper over one of the sack holding devices, a valve in each chute, a deflecting valve in the hopper controlling the delivery of material to the chutes, means for simultaneously operating the chute and hopper valves whereby material is alternately deflected in the chutes and delivered thereby, and a circuit closer on the scale connected with the valve operating means.

5. In a weighing device, a scale, a hopper mounted above the scale, diverging chutes extending from the hopper over the scale, a valve in each chute, a deflecting valve in the hopper at the intersection of the chutes, connections between the valves for swinging the same simultaneously, solenoids adjacent the hopper arranged to be alternately energized, and means having connection with the solenoids and the valves for swinging the latter.

In testimony whereof I have signed my name to this specification in the presence of two subscribing witnesses.

HARRY DUNKERLY.

Witnesses:
H. H. SAVAGE,
R. H. LOWE.